United States Patent [19]
Ohnesorge

[11] Patent Number: 5,987,761
[45] Date of Patent: Nov. 23, 1999

[54] AXLE MEASUREMENT HOLDER TO FASTEN A MEASURING HEAD TO THE RIM OF A VEHICLE WHEEL

[75] Inventor: Axel Ohnesorge, Burgwedel, Germany

[73] Assignee: Haweka Auswuchttechnik Horst Warkotsch GmbH, Germany

[21] Appl. No.: 08/823,047

[22] Filed: Mar. 21, 1997

[30] Foreign Application Priority Data

Feb. 5, 1997 [DE] Germany ............................ 197 04 163

[51] Int. Cl.⁶ .................................................. G01B 5/255
[52] U.S. Cl. ..................................... 33/203.18; 33/203.19
[58] Field of Search ........................... 33/203.18, 203.19, 33/203.2

[56] References Cited

U.S. PATENT DOCUMENTS

| | | | |
|---|---|---|---|
| 3,758,958 | 9/1973 | Jordan | 33/203.18 |
| 4,377,038 | 3/1983 | Ragan | 33/203.18 |
| 5,048,192 | 9/1991 | Pascoal | 33/203.18 |
| 5,179,784 | 1/1993 | Kowis | 33/203.18 |
| 5,625,953 | 5/1997 | Healy et al. | 33/203.18 |

*Primary Examiner*—Christopher W. Fulton
*Attorney, Agent, or Firm*—Olson & Hierl, Ltd.

[57] ABSTRACT

An axle measurement holder device to fasten a measuring head to the rim (5) of a vehicle wheel (2), includes a base body (3) for direct or indirect stable contact with a rim (5) of a vehicle wheel (2). Two arms (13, 14) arranged diametrically opposed feature respective hooks (15, 16) at their ends that are directed radially outward to hook into a tread of a tire (17). The ends of the arms (13, 14) directed radially toward the inside are attached by means of a pivot bearing (11, 12) to the end of a one armed lever (13, 14), the end of which is directed away from the base body (3), the other end of which is connected to the base body (3) via an articulation (20, 21) and tension springs (22, 23). The one armed levers (7, 8) can be tensed radially inward by means of clamping devices. The one armed levers (7, 8) are each preloaded radially toward the outside by centering springs (33, 34) which exert the same force and have the same characteristics and which are supported at a central point of the base body (3). The centering springs (33, 34) hold the arms (13, 14) and thereby the hooks (15, 16) located at their ends in any tensed position at the same radial distance to the axle that is defined by the axle shaft (6). This simplifies the attachment and clamping of the axle measurement holder device.

20 Claims, 3 Drawing Sheets

AXLE MEASUREMENT HOLDER TO FASTEN A MEASURING HEAD TO THE RIM OF A VEHICLE WHEEL

BACKGROUND OF THE INVENTION

The invention relates to an axle measurement holder device to fasten a measuring head to the rim of a vehicle wheel.

An axle measurement holder device of the type at issue is known from the company brochure "PROVAC," Edition 1996, of Siege Social et Agence France Sud, 16 Premiere rue, Z1-BP 127-13744 Vitrolles cedex. It features a base body consisting of two parallel bars, at the ends of which are attachment heads for the attachment to a rim of a vehicle wheel. The bars are provided with two arms arranged in a diametrically opposed manner, featuring hooks to hook into the tread of the tire at their ends that are directed radially outward. The ends of the arms directed radially inward are attached, by means of a pivot bearing, to a one armed lever that essentially faces axially away from the base body, the other end of which is connected via an articulation to a holding device arranged on the bars. The arms are acted upon by springs that act radially inward. The one armed levers can be tensed toward the inside by means of clamping devices. As a result of this tension, the one armed levers are swiveled toward the inside and the articulated radial inner ends of the arms are thereby moved radially toward the inside. In doing so the hooks at the ends of the arms are also moved radially toward the inside, so that the hooks hook into the tread of a tire. Since the pivot bearings of the arms are in a plane which is axially distant from the plane in which the hooks are located, an axial force as well as a radial force are created by means of the tension resulting from the clamping devices, said force pulling the base body toward the rim.

One disadvantage of this known axle measurement holder device resides in the fact that before and during tensioning the arms and therefore also the hooks are not symmetrized, i.e. they are in an undefined pivot position. This creates the danger that the hooks will not hook in the same plane perpendicular to the axle, with the consequence that the axle measurement holder device is not pulled to the rim in the proper axial position, whereby at the same time the axial tension force of the arms will be different. Measurement mistakes may arise in this manner, which can only be partially prevented by controlled manual clamping of the axle measurement device with the precise control of the hooking locations of the hooks. But this procedure is clumsy.

The invention has the basic task of creating an axle measurement holder device of the type including a base body for contact with the rim of a vehicle wheel and two diametrically oppositely arranged arms which have hooks on their ends directed radially outward for the purpose of hooking onto the tread of a tire and which at their ends which are directed radially inward, are respectively articulated by means of a bearing to an end of a one armed lever that is directed away from the base body, and the other end of which is connected to the base body by means of an articulation and a compression spring and by clamping means by means of which the one armed levers can be tensed radially inward, which is easy to operate and nevertheless facilitates the precise positioning and attachment of the axle measurement holder device to the rim of a vehicle wheel.

The task which is the basis for the invention is accomplished by the fact that the one armed levers are respectively preloaded radially outward by means of centering springs which exert the same forces and have the same characteristics and are supported on a central point of the base body.

The basic concept of this teaching consists of assuring a symmetrical alignment of the one armed levers in any clamping position relative to the center of the axle measurement holder device, by providing two springs that exert the same force and which have the same characteristics, supported at a central point of the base body and, in addition, pressing radially toward the outside against the one armed levers. The tensioning devices are thereby positioned symmetrically in any clamping position relative to the central point and thereby to the axle of the axle measurement holder device, with the consequence that the tension by the clamping devices is also accomplished symmetrically.

A further development of the invention resides in having the clamping devices feature a diametrically arranged rotatable threaded bar with two oppositely directed threaded sections, each of which is in operational connection with a complementary female thread in a journal which is connected in a rotating manner to the one armed lever between its articulations, around an axis which is parallel to the pivot axis of the articulation of the one armed lever. The springs are coil springs that are arranged on the threaded sections and that are supported on a stop on the threaded bar on the end directed radially outward, and the other end is supported on a central block on the base body. This embodiment is particularly simple and, moreover, includes the advantage that the stops may be formed by nuts on the threaded sections, by means of which the symmetrical alignment of the one armed levers can be achieved.

The arms are advantageously formed of bell cranks, the other arms of which are connected via articulations to the tension springs which are constructed as compression springs, the other ends of which are connected to the base body via articulations. This arrangement, according to a further development of this form of embodiment, can be implemented such that the one armed levers and the tension springs designed as compression springs, respectively, form a parallel guide.

According to one embodiment of the invention there are at least two groups of parallel axis bore holes in the base body positioned on different circles having different diameters and/or in varying number and at the same circumferential distance. A group of contact pins of the same length can be inserted into the bore holes. In this manner the attachment points defined by the ends of the contact pins can be allocated to defined contact points on the rim or holes in the rim or spaces between the spokes of the rim, so that they extend through the holes or intermediate spaces and can contact a brake disc arranged behind the rim by means of their ends, said brake disc representing an exact reference plane, and thereby assuring a parallel holding device of the axle measurement holder.

In order to be able to easily locate the bore holes that belong to one group the bore holes, according to a further development of this embodiment, feature a depression at the ends opposite the insertion points, whereby the depressions of one group of centering bore holes look alike, while the depressions of different groups of bore holes appear different. The depressions at the bore holes may feature different shapes and/or depths and/or diameters to create differing appearances. Expediently, they may also feature a different color. Regarding the shape of the depressions, a radial strip design is advantageous.

BRIEF DESCRIPTION OF DRAWING

The invention shall be explained in more detail by means of the drawing.

DETAILED DESCRIPTION OF THE PRESENT INVENTION

Figure 1:
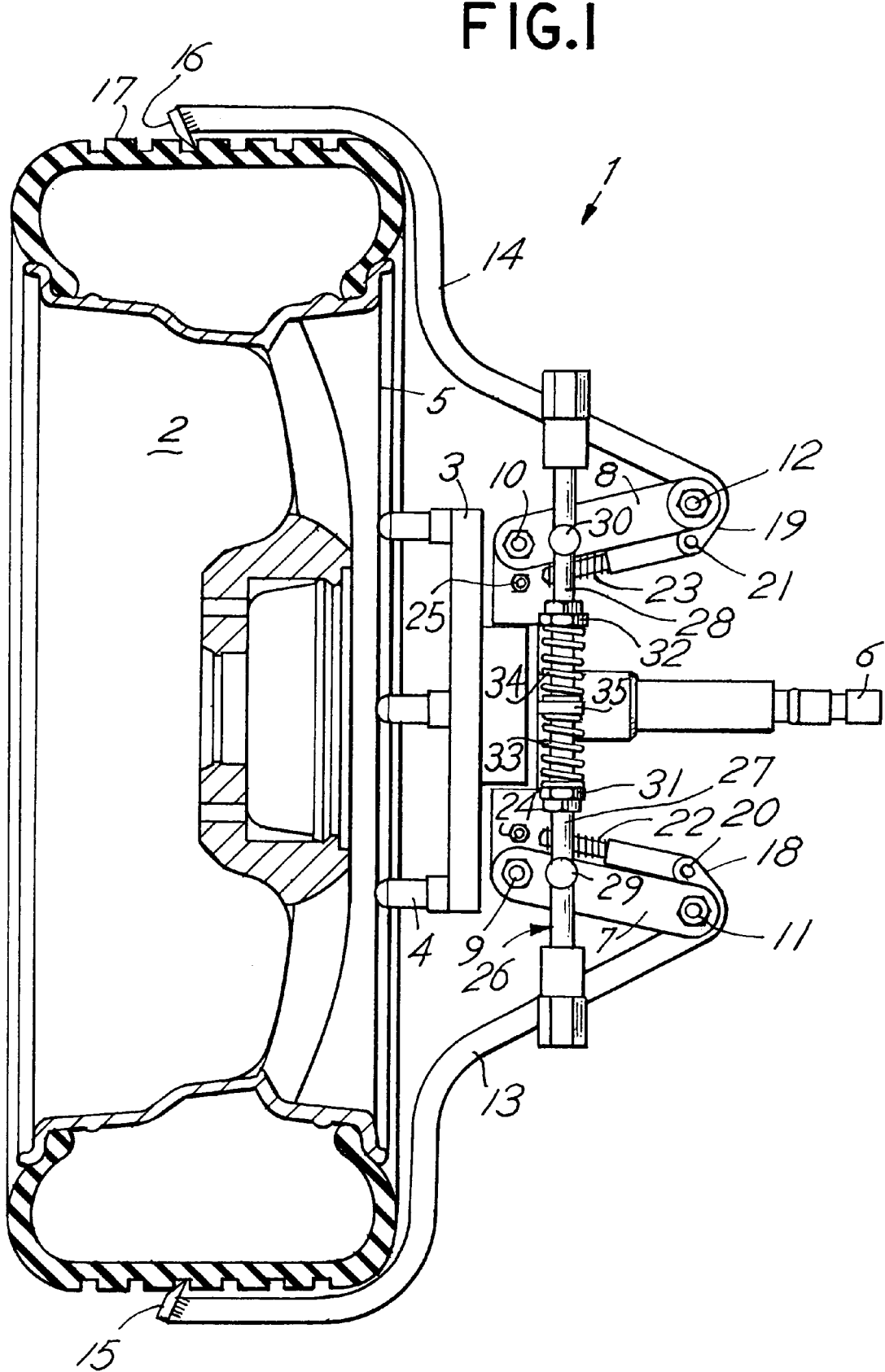
FIG. 1 shows an exemplified embodiment of the invention in connection with a vehicle wheel, in a sectional radial view.

FIG. 1 shows the axle measuring holding device 1 in a position in which it is fastened to a vehicle wheel 2. The axle measurement holder device 1 features a base body 3 which has contact supports 4 for attachment to a rim 5 of the vehicle wheel 2. The base body 3 features an axle support 6 to which a measuring head can be attached, with the aid of which the alignment of the vehicle wheel 2, respectively its rim 5 can be measured and the toe-in and camber can be adjusted in the desired manner.

One armed levers 7, 8 are attached by means of articulations 9, 10 to the base body 3. Arms 13, 14 are attached at the free ends of the one armed levers 7, 8 by means of pivot bearings 11, 12, said arms being diametrically opposed and featuring hooks 15, 16 at their ends, which can be hooked into the tread of a tire 17 of the vehicle wheel 2.

The arms 13, 14 that pivot around the pivot bearings 11, 12 form a bell crank, together with arms 18, 19. Tension springs 22, 23 that are constructed as compression springs are connected to the ends of the arms 18, 19 via articulations 20, 21, the other ends of the springs being connected to the base body 3 via articulations 24, 25. The tension springs 22, 23, together with the one armed levers 7, 8 form parallel guides.

A threaded bar 26 features 2 opposing threaded sections 27, 28 which are in operating connection with the complementary female threads in journals 29, 30, which are pivotably attached to one armed levers 7, 8. Adjustable nuts 31, 32 are located radially inside the journals 29, 30, on the threaded sections 27, 28, serving as supports for the coil springs 33, 34 which are arranged on the threaded sections 27, 28 and which are supported at a central support 35. Handles 36, 37 by means of which the threaded bar 26 can be turned are located at the ends of the threaded bar 26. When turning the threaded bar 26 the journals 29, 30 move radially in opposing directions, and therefore also the one armed levers 7, 8 and finally also the arms 13, 14 with their hooks 15, 16.

In order to fasten the axle measurement holder device 1 at the rim 5 of the vehicle wheel 2, first the threaded bar 26 is turned by means of one of the handles 36 or 37 or by means of the two handles 36, 37 in a manner such that the distance between hooks 15, 16 is slightly greater than the outer diameter of the tire 17. Thereafter the base body 3 with the attaching journals 4 is brought into contact, in the axial direction, with rim 5 and is kept in this position until the hooks 15, 16 hook into the outer tread of the tire 17 by turning the threaded rod 26. If, at this point, the threaded rod 26 is turned still farther, the hooks 15, 16 are forcefully pulled against the tire 17, in which case the reaction force is created by the tensioning springs 23, 24. The contact of the hooks 15, 16 at the tire 17 is thus accomplished elastically. During this tensioning operation an axially acting force is created in addition to the force exerted radially by the hooks 15, 16, due to the fact that the pivot bearings 11, 12 circle the journals 9, 10, whereby the arms 13, 14 not only move radially toward the inside, but also axially away from the vehicle wheel 2. As a result the hooks 15, 16 are kept in elastic contact on the tread of the tire 17 and at the same time the base body 3, with its contact supports 4, is pulled elastically against the rim 5.

The coil springs 33, 34 exert the same force and have the same characteristics, and the nuts 31, 32 are adjusted in such a way that the supports 29, 30 are the same radial distance from the central support 35. Due to their equal force and spring characteristics, the coil springs 33, 34 not only always keep the supports 29, 30 at the same distance to the central support 35 in any adjusted position of the threaded bar 26, but at the same time the one armed levers 7, 8, the tensioning springs 22, 23 and thereby also the arms 13, 14 with their hooks 15, 16 are always in a symmetrical position with regard to the axle journal 6, with the consequence that when fastening the measurement head the head will be kept in an axially symmetric position and, in this position, will also be pulled toward the rim 5 of the vehicle wheel 2. Therefore, the attachment and fastening of the axle measurement holder device is considerably facilitated.

Figure 2:
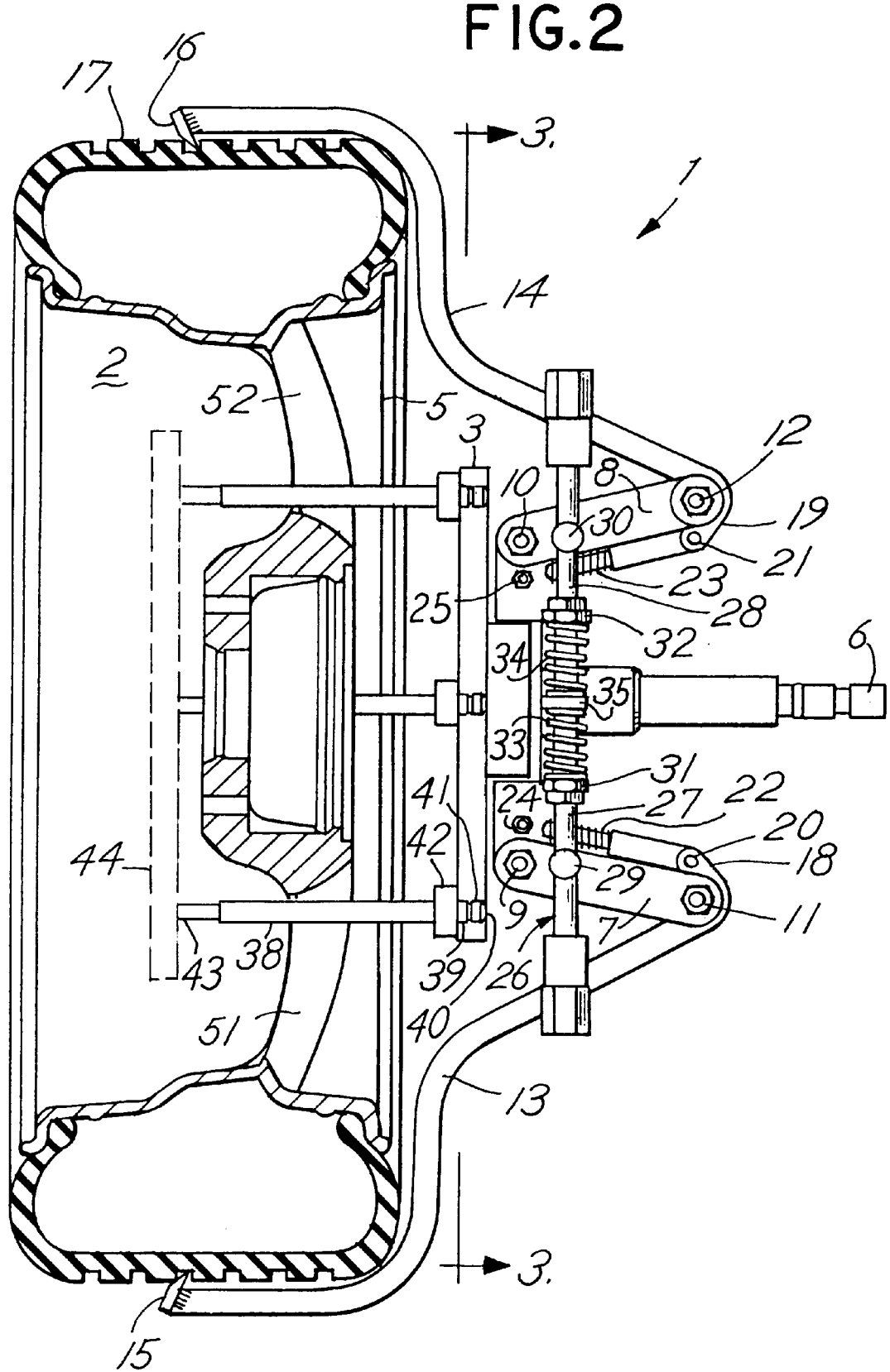
FIG. 2 shows a variation of the exemplified embodiment according to FIG. 1.

FIG. 2 shows a variation of the embodiment according to FIG. 1. Like or corresponding parts are designated by the same reference numbers. The difference resides in the fact that the contact supports 4 in FIG. 1 are replaced by contact pins 38, which have lugs 39 which are inserted into complementary bore holes 40 in the base body 3, whereby an O-ring 31 inserted in a groove keeps the lug 39 in the bore hole and at the same time facilitates easy insertion and removal. The contact pins 38 have flanges 42 which, after the insertion of lugs 39, contact the side of the base body 3 facing the vehicle wheel 2. All contact pins 38 are of the same length, so that their ends 43 make contact on the same plane with a brake disc 44 designated by dashed lines. It is thereby assured that, after fastening the axle measurement holder, the base body 3 runs exactly parallel with the brake disc 44.

Figure 3:
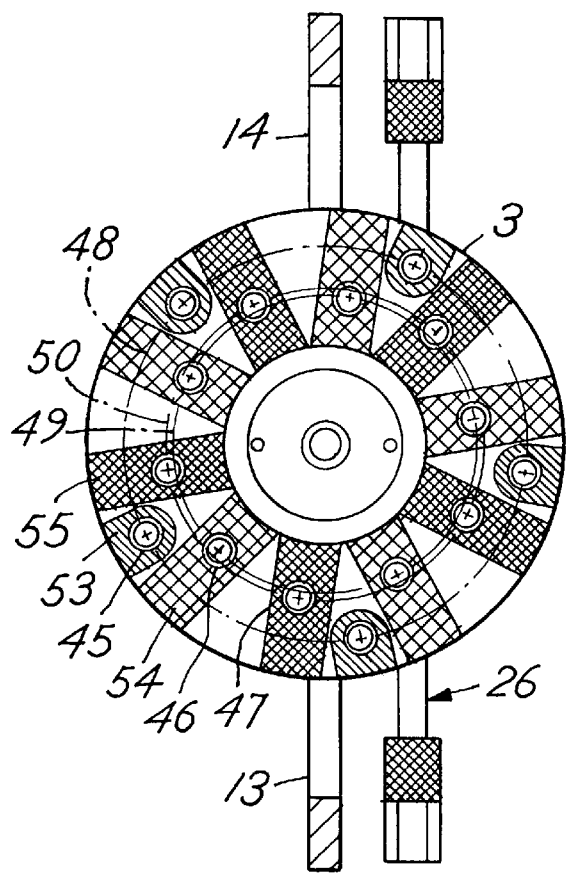
FIG. 3 shows a cross section 3—3 through FIG. 2.

FIG. 3 shows a cross section III—III through FIG. 3. Therefore, FIG. 3 essentially shows an axial view onto the base body 3 as seen from the vehicle wheel 2. It can thus be seen in FIG. 3 that there are 3 groups of bore holes 45, 46, 47 in the base body 3, said bore holes being located on circles 48, 49, 50 and are mutually equidistant. In this way it is possible, by inserting the contact pins 38 into different groups of bore holes 45, 46 or 47, to adjust the radial position of the contact pins to the rims 5 of a vehicle wheel 2, for example as shown in the embodiment according to FIG. 2, so that the contact pins 38 protrude through the intermediate spaces between the spokes 51, 52 of the rim 5 of the vehicle wheel 2 and make contact in the desired manner at the brake disc 44 with their ends 43.

As can be seen in FIG. 3, the group of bore holes 45, 46, 47 are provided with markings in the form of radial strips 53, 54, 55 in order to be able to locate the associated bore holes 45, 46 or 47 belonging to one group when inserting the contact pins 38.

Figure 4:
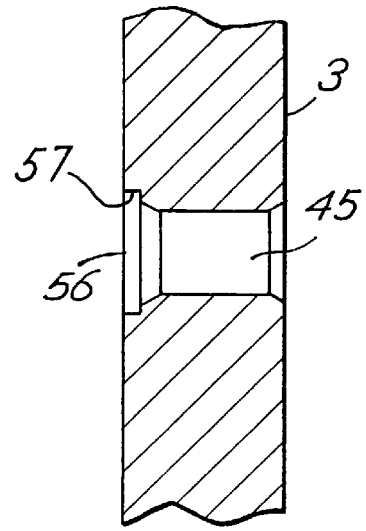
FIG. 4 shows a partial section of a detail from FIG. 2 in the area of a bore hole.

FIG. 4 shows an enlarged partial section through the base body 3 in the area of a bore hole 45 in FIG. 3. It can be seen that the bore hole 45 features a depression 57 indicated by an arrow 56 in the direction of insertion for a contact pin 38, said depression is marked in color, which cannot be seen in the drawing. As a result of the depression, the paint layer can practically not be obliterated, so that it will be permanently visible and the bore holes belonging to one group will be easy to locate as a result of the different colored markings.

I claim:

1. An axle measurement holder to fasten a measuring head onto a rim (5) of a vehicle wheel(2), with a base body (3) for direct or indirect stable contact with the rim (5) of the vehicle wheel (2), with two diametrically oppositely arranged arms (13, 14), which feature hooks (15, 16) on their ends directed radially outward, for the purpose of hooking onto the tread of a tire (17), and which, at their ends which are directed radially inward, are respectively articulated by means of a pivot bearing (11, 12) to an end of a one armed lever (7, 8) that is directed away from the base body (3), the other end of which is connected to the base body (3) by means of an articulation (20, 21) and a compression spring (22, 23), and by clamping means by means of which the one armed levers(7, 8) can be tensed radially inward, characterized by the fact that the one armed levers (7, 8) are respectively preloaded radially outward by means of centering springs (33, 34) which exert the same force and have the same characteristics and are supported on a central point of the base body (3).

2. An axle measurement holder according to claim 1, characterized by the fact that the means for clamping feature a diametrically arranged rotatable threaded bar (26) with two opposite threaded sections (27, 28) which are in operating contact with a complementary inner thread in a journal (29, 30), said journal being rotatably connected with the one armed levers (7, 8) between its articulation (9, 10) and pivot bearing (11, 12) by means of an axis parallel to the swivel axis of the articulation (9, 10) of the one armed lever (7, 8), and that the centering springs are coil springs which are respectively arranged on the threaded sections (27, 28) and are respectively supported on the radially outward directed ends on a stop on the threaded bar (26), and are supported at the other end on a central support (35) on the base body (3).

3. An axle measurement holder according to claim 1, characterized by the fact that the arms (13, 14) are respectively part of the angled levers, the other arms (18, 19) of which are connected by means of articulations (20, 21) with tension springs (22, 23) constructed as compression springs, the other ends of which are connected by means of articulations (24, 25) with the base body (3).

4. An axle measurement holder according to claim 3, characterized by the fact that the one armed levers (7, 8) and the tension springs (22, 23) respectively form a parallel guide.

5. An axle measurement holder according to claim 3, characterized by the fact that the contact pins (38) are of such length that they extend through the rim (5) of the vehicle wheel (2) at the axle measurement holder (1) that is fastened to the vehicle wheel (2) and push against a brake disc (44) arranged at the inner area of the rims (5) with their ends (43).

6. An axle measurement holder according to claim 1, characterized by the fact that at least two groups of bore holes (45, 46) with parallel axes are arranged on different circles (48, 49) with differing diameters, into which a respective group of contact pins (38) of the same length are inserted.

7. An axle measurement holder according to claim 6, characterized by the fact that the bore holes (45, 46, 47) respectively feature a depression (53, 54, 55) on their ends opposite the insertion direction of the contact pins (38), whereby the depressions (53, 54, 55) of one group of bore holes (45, 46, 47) appear the same, the depressions (53, 54, 55) of differing groups of bore holes (45, 56, 47), however, appear different.

8. An axle measurement holder according to claim 7, characterized by the fact that the depressions (53, 54, 55) for the bore holes (45, 46, 47) have different forms and different depths, in order to generate a different appearance.

9. An axle measurement holder according to claim 7, characterized by the fact that the depressions (53, 54, 55) of different groups of bore holes (45, 46, 47) have a different colored surface.

10. An axle measurement holder according to claim 7, characterized by the fact that the depressions (53, 54, 55) have the form of radial strips.

11. An axle measurement holder according to claim 7, characterized by the fact that the depressions (53, 54, 55) for the bore holes (45, 56, 47) have different forms and different diameters in order to generate a different appearance.

12. An axle measurement holder according to claim 7, characterized by the fact that the depressions (53, 54, 55) for the bore holes (45, 56, 47) have different depths and different diameters in order to generate a different appearance.

13. An axle measurement holder to fasten a measuring head to a vehicle wheel (2), with a base body (3), with means to axially clamp the base body (3) against the vehicle wheel (2) and with contact pins (38) arranged on the base body (3) and extending axially therefrom, characterized by the fact that in the base body (3) at least two groups of bore holes (45, 46, 47) with parallel axes are arranged on various circles of differing diameter in which a group of respective contact pins (38) of the same length are inserted.

14. An axle measurement holder according to claim 13, characterized by the fact that the contact pins are of a length such that they extend through the rim (5) of the vehicle wheel (2) at the axle measurement holder (1) fastened to the vehicle wheel (2), and push against a brake disc (44) arranged at the inner area of the rims (5) with their ends (43).

15. An axle measurement holder according to claim 13, characterized by the fact that the bore holes (45, 46, 47) respectively feature a depression (53, 54, 55) at their ends opposite the direction of insertion of the contact pins (38), whereby the depressions (53, 54, 55) of a group of bore holes (45, 46, 47) all have the same appearance, the depressions (53, 43, 55) of differing groups of bore holes (45, 46, 47), however, have a different appearance.

16. An axle measurement holder according to claim 13, characterized by the fact that the depressions (53, 54, 55) of bore holes (45, 46, 47) have different forms and different depths in order to generate different appearances.

17. An axle measurement holder according to claim 13, characterized by the fact that the depressions (53, 54, 55) of differing groups of bore holes (45, 436, 47) have different surface colors.

18. An axle measurement holder according to claim 13, characterized by the fact that the depressions (53, 54, 55) have the form of radial strips.

19. An axle measurement holder according to claim 13, characterized by the fact that the depressions (53, 54, 55) for the bore holes (45, 56, 47) have different forms and different diameters in order to generate a different appearance.

20. An axle measurement holder according to claim 13, characterized by the fact that the depressions (53, 54, 55) for the bore holes (45, 56, 47) have different depths and different diameters in order to generate a different appearance.

* * * * *